(12) United States Patent
Xu et al.

(10) Patent No.: US 9,510,255 B2
(45) Date of Patent: Nov. 29, 2016

(54) NETWORK HANDOVER METHOD AND APPARATUS

(71) Applicant: Huawei Technologies Co., Ltd., Shenzhen (CN)

(72) Inventors: Min Xu, Shanghai (CN); Zheng Zhou, Beijing (CN); Dong Chen, Shanghai (CN); Yuan Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 14/273,453

(22) Filed: May 8, 2014

(65) Prior Publication Data

US 2014/0242994 A1    Aug. 28, 2014

Related U.S. Application Data

(63) Continuation of application No. PCT/CN2012/084316, filed on Nov. 8, 2012.

(30) Foreign Application Priority Data

Nov. 8, 2011    (CN) .......................... 2011 1 0352016

(51) Int. Cl.
*H04W 36/04* (2009.01)
*H04W 36/14* (2009.01)
*H04W 36/00* (2009.01)

(52) U.S. Cl.
CPC ......... *H04W 36/14* (2013.01); *H04W 36/0055* (2013.01); *H04W 36/04* (2013.01)

(58) Field of Classification Search
None
See application file for complete search history.

(56) References Cited

U.S. PATENT DOCUMENTS

| | | |
|---|---|---|
| 2007/0237156 A1 | 10/2007 | Wang |
| 2010/0164864 A1 | 7/2010 | Chou |
| 2010/0184439 A1 | 7/2010 | Chen et al. |
| 2011/0081928 A1* | 4/2011 | Chen .................. H04W 76/048 455/507 |
| 2011/0276421 A1 | 11/2011 | Zhu et al. |
| 2011/0300867 A1 | 12/2011 | Matsuo et al. |
| 2012/0002637 A1* | 1/2012 | Adjakple .......... H04W 36/0055 455/436 |
| 2012/0020346 A1* | 1/2012 | Ganapathy ........ H04W 36/0033 370/338 |
| 2012/0064903 A1* | 3/2012 | Pani .................. H04W 36/0088 455/450 |

(Continued)

FOREIGN PATENT DOCUMENTS

| CN | 1553642 A | 12/2004 |
|---|---|---|
| CN | 1859154 A | 11/2006 |

(Continued)

OTHER PUBLICATIONS

Mitts, H.; Luijten, G.; Korinthios, J.A.; Nelson, J., "Connectionless signaling network layer in UMTS," in Personal Communications, IEEE, vol. 3, No. 3, pp. 44-53, Jun. 1996 doi: 10.1109/98.511764.*

(Continued)

*Primary Examiner* — Lester Kincaid
*Assistant Examiner* — Daniel G Bassett
(74) *Attorney, Agent, or Firm* — Slater Matsil, LLP

(57) ABSTRACT

The present invention discloses a network handover method and apparatus. In the network handover method, by a base station gateway receives a handover request message or a radio link establishment request message that is sent by a source cell RNC. The base station gateway performs an access control process or initiating an access control process to a core network.

13 Claims, 9 Drawing Sheets

(56) References Cited

U.S. PATENT DOCUMENTS

| | | | |
|---|---|---|---|
| 2012/0100860 A1* | 4/2012 | Lei | H04W 36/20 455/438 |
| 2012/0102213 A1 | 4/2012 | Qian et al. | |
| 2012/0106456 A1 | 5/2012 | Jin et al. | |
| 2012/0108244 A1* | 5/2012 | Shi | H04W 36/0022 455/438 |
| 2012/0129529 A1 | 5/2012 | Deng et al. | |
| 2012/0135709 A1* | 5/2012 | Deng | H04W 36/0016 455/411 |
| 2012/0166660 A1 | 6/2012 | Zhang et al. | |
| 2012/0201206 A1* | 8/2012 | Wang | H04W 8/18 370/329 |
| 2012/0207128 A1* | 8/2012 | Wang | H04W 36/0027 370/331 |
| 2012/0207132 A1* | 8/2012 | Wang | H04W 36/08 370/331 |
| 2013/0064226 A1* | 3/2013 | Dinan | H04W 36/0083 370/332 |
| 2013/0077785 A1* | 3/2013 | Feng | H04W 12/04 380/44 |
| 2013/0237221 A1* | 9/2013 | Drazynski | H04W 36/0083 455/434 |
| 2014/0011521 A1 | 1/2014 | Hu | |
| 2014/0105145 A1 | 4/2014 | Gao et al. | |

FOREIGN PATENT DOCUMENTS

| | | | | |
|---|---|---|---|---|
| CN | 1859292 A | 11/2006 | | |
| CN | 1953431 A | 4/2007 | | |
| CN | 1988578 A | 6/2007 | | |
| CN | 101212384 A | 7/2008 | | |
| CN | 101299694 A | 11/2008 | | |
| CN | 101304350 A | 11/2008 | | |
| CN | 101330704 A | 12/2008 | | |
| CN | 101340345 A | 1/2009 | | |
| CN | 101355781 A | 1/2009 | | |
| CN | 101400087 A | 4/2009 | | |
| CN | 101400106 A | 4/2009 | | |
| CN | 101437223 A | 5/2009 | | |
| CN | 101466128 A | 6/2009 | | |
| CN | 101500281 A | 8/2009 | | |
| CN | 101552696 A | 10/2009 | | |
| CN | 101588580 A | 11/2009 | | |
| CN | 101600157 A | 12/2009 | | |
| CN | 101631309 A | 1/2010 | | |
| CN | 101646225 A | 2/2010 | | |
| CN | 101686162 A | 3/2010 | | |
| CN | 101730311 A | 6/2010 | | |
| CN | 101741993 A | 6/2010 | | |
| CN | 101742614 A | 6/2010 | | |
| CN | 101754211 A | 6/2010 | | |
| CN | 101754326 A | 6/2010 | | |
| CN | 101770299 A | 7/2010 | | |
| CN | 101784094 A | 7/2010 | | |
| CN | 101784096 A | 7/2010 | | |
| CN | 101789882 A | 7/2010 | | |
| CN | 101801063 A | 8/2010 | | |
| CN | 101820625 A | 9/2010 | | |
| CN | 101841810 A | * | 9/2010 | H04W 12/04 |
| CN | 101932049 A | 12/2010 | | |
| CN | 101932072 A | 12/2010 | | |
| CN | 101932074 A | 12/2010 | | |
| CN | 101938806 A | 1/2011 | | |
| CN | 101945390 A | 1/2011 | | |
| CN | 101945429 A | 1/2011 | | |
| CN | 101990247 A | 3/2011 | | |
| CN | 101998542 A | * | 3/2011 | H04W 36/0016 |
| CN | 101998619 A | 3/2011 | | |
| CN | 101998670 A | 3/2011 | | |
| CN | 102014039 A | 4/2011 | | |
| CN | 102026334 A | * | 4/2011 | H04W 8/18 |
| CN | 102098614 A | 6/2011 | | |
| CN | 102104554 A | 6/2011 | | |
| CN | 102118686 A | 7/2011 | | |
| CN | 102123394 A | * | 7/2011 | H04W 36/0027 |
| CN | 102123462 A | 7/2011 | | |
| CN | 102131258 A | 7/2011 | | |
| CN | 102137381 A | 7/2011 | | |
| CN | 102137471 A | 7/2011 | | |
| CN | 102143506 A | 8/2011 | | |
| CN | 102378304 A | 3/2012 | | |
| CN | 102447746 A | 5/2012 | | |
| CN | 102612114 A | 7/2012 | | |
| CN | 102710468 A | 10/2012 | | |
| CN | 102833814 A | 12/2012 | | |
| CN | 102869116 A | 1/2013 | | |
| CN | 102883378 A | 1/2013 | | |
| CN | 102932833 A | 2/2013 | | |
| EP | 2330779 A1 | 6/2011 | | |
| EP | 2387275 A1 | 11/2011 | | |
| EP | 2389032 A1 | 11/2011 | | |
| EP | 2458916 A1 | 5/2012 | | |
| EP | 2667677 A1 | 11/2013 | | |
| EP | 2680495 A1 | 1/2014 | | |
| WO | 2010036181 A2 | 4/2010 | | |
| WO | 2010081437 A1 | 7/2010 | | |
| WO | 2010098035 A1 | 9/2010 | | |
| WO | 2010121433 A1 | 10/2010 | | |
| WO | 2010133030 A1 | 11/2010 | | |
| WO | 2011017944 A1 | 2/2011 | | |
| WO | WO 2011023099 A1 | * | 3/2011 | H04W 36/08 |
| WO | 2011109999 A1 | 9/2011 | | |
| WO | 2011116732 A2 | 9/2011 | | |
| WO | 2012055089 A1 | 5/2012 | | |

OTHER PUBLICATIONS

Panasonic, "UE Access Control in CSG Cell," R2-082238 3GPP TSG RAN WG2 #62, May 5-9, 2008, Kansas City, USA, 6 pages.

3rd Generation Partnership Project, Technical Specification Group Radio Access Network, UTRAN Architecture for 3G Home Node B (HNB), Stage 2 (Release 10), 3GPP TS 25.467 V10.3.0 (Sep. 2011), 58 pages.

Huawei, "Access Control during Inbound Handover for UMTS," 3GPP TSG-RAN WG3#65, R3-091754, Shenzhen, P. R. China, Aug. 24-28, 2009, 3 pages.

\* cited by examiner

NETWORK HANDOVER METHOD AND APPARATUS

This application is a continuation of International Application No. PCT/CN2012/084316, filed on Nov. 8, 2012, which claims priority to Chinese Patent Application No. 201110352016.5, filed on Nov. 8, 2011, both of which are hereby incorporated by reference in their entireties.

TECHNICAL FIELD

The present invention relates to the field of communications technologies and, in particular embodiments, to a network handover method and apparatus.

BACKGROUND

With the development of mobile communications technologies, user requirements become more diversified. To meet diversification of user requirements, home indoor coverage base stations, enterprise-class internal coverage base stations, and some other private networks emerge. Currently, a micro cell base station (for example, Home NodeB, hereinafter referred to as HNB) is one of the most promising low-cost access technologies.

A micro cell has three different access modes: a closed mode, a hybrid mode, and an open mode. In the closed mode, only subscribers are allowed to access the cell; in the hybrid mode, all users are allowed to access the cell, but subscribers and non subscribers are distinguished, and provided with different access levels and service levels; and in the open mode, a situation is similar to that in a macro cell, and access of all users is allowed.

When a user equipment (UE) moves from a macro cell to a micro cell, a network handover needs to be performed, but in the prior art, the network handover cannot be implemented by using a soft handover or a hard handover.

SUMMARY OF THE INVENTION

Embodiments of the present invention provide a network handover method and apparatus, to implement a network handover by using a soft handover or a hard handover.

According to one aspect, the present invention provides a network handover method. A base station gateway receives a handover request message or a radio link establishment request message that is sent by a source cell radio network controller (RNC). The base station gateway performs an access control process or initiates an access control process to a core network.

According to another aspect, the present invention provides a network handover method. After a source cell RNC receives a cell update message or a measurement report message that is sent by a user equipment (UE), the source cell RNC initiates an access control process to a core network or a base station gateway.

According to another aspect, the present invention provides a network handover method. After a source cell RNC completes access control, the base station gateway receives and verifies a handover request message or a radio link establishment request message that is sent by the source cell RNC. The handover request message or the radio link establishment request message carries a CSG ID and/or member state information. The base station gateway sends the handover request message or the radio link establishment request message to a target cell base station.

According to another aspect, the present invention provides a network handover method. After a target cell base station receives a cell update message sent by a user equipment (UE), a base station gateway receives an uplink signaling transmission indication message sent by the target cell base station. The base station gateway sends the uplink signaling transmission indication message to a source cell RNC, where the uplink signaling transmission indication message carries the cell update message and/or a CSG ID and/or a cell access mode.

According to another aspect, the present invention provides a network handover method, including: after a target cell base station receives a cell update message sent by a user equipment (UE), where the cell update message carries a user equipment (UE) identifier and/or UE capability indication information, receiving, by a base station gateway, an uplink signaling transmission indication message sent by the target cell base station, where the uplink signaling transmission indication message carries the cell update message; performing, by the base station gateway, an access control process or initiating an access control process to a core network; and sending, by the base station gateway, the uplink signaling transmission indication message to a source cell RNC, where the uplink signaling transmission indication message carries the cell update message and/or an access control completion indication message.

According to one aspect, the present invention provides a base station gateway, including: a first receiving unit, configured to receive and process a handover request message or a radio link establishment request message that is sent by the source cell RNC; and a first processing unit, configured to perform an access control process; and/or a second processing unit, configured to initiate an access control process to a core network.

According to another aspect, the present invention provides a source cell radio network controller (RNC). A first receiving unit is configured to receive a cell update message or a measurement report message that is sent by a user equipment (UE). A first storing unit is configured to store UE capability indication information and/or cell identifier information. A first sending unit is configured to initiate an access control process to a core network or a base station gateway.

According to another aspect, the present invention provides a base station gateway, including: a first receiving and verifying unit, configured to receive and verify a handover request message or a radio link establishment request message that is sent by a source cell RNC, where the handover request message or the radio link establishment request message carries a CSG ID; and a sending unit, configured to send a handover response message or a radio link establishment response message.

According to another aspect, the present invention provides a base station gateway, including: a receiving unit, configured to receive an uplink signaling transmission indication message sent by a target cell base station, where the uplink signaling transmission indication message carries a cell update message and/or a CSG ID and/or a cell access mode; and a sending unit, configured to send the uplink signaling transmission indication message to a source cell RNC.

According to another aspect, the present invention provides a base station gateway, including: a receiving unit, configured to receive an uplink signaling transmission indication message sent by a target cell base station, where the uplink signaling transmission indication message carries a cell update message, and the cell update message carries a user equipment (UE) identifier and/or UE capability indication information; a first processing unit, configured to perform an access control process; and/or a second processing unit, configured to initiate an access control process to a core network; and a sending unit, configured to send the uplink signaling transmission indication message to a source cell RNC, where the uplink signaling transmission indication message carries the cell update message and/or an access control completion indication message.

The embodiments of the present invention provide a network handover method and apparatus, to implement a network handover from a macro cell to a micro cell by using a soft handover or a hard handover.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
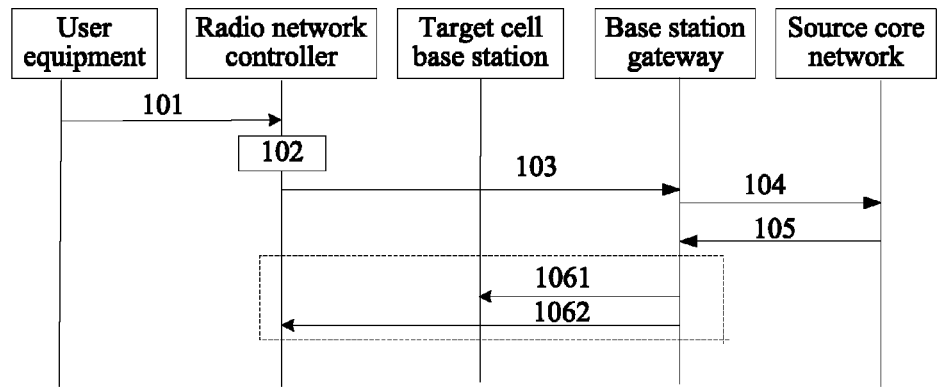
FIG. 1 is a schematic diagram of a network handover method according to an embodiment of the present invention.

For a description instead of a limitation, specific details such as a specific system structure, interface, and technology are described in the following for a full understanding of the present invention. However, persons skilled in the art should be aware that the present invention may also be implemented in other embodiments without these specific details. In other cases, detailed descriptions about well-known apparatuses, circuits, and methods are omitted, so as to prevent unnecessary details from hindering descriptions of the present invention.

Technologies described in this specification may be applied to various wireless communications systems, for example, the existing 2G and 3G communications systems and the next generation communications system, such as the Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a Single Carrier FDMA (SC-FDMA) system, a General Packet Radio Service (GPRS) system, a Long Term Evolution (LTE) system, and other similar communications systems.

In this specification, various aspects are described with reference to a terminal and/or a base station and/or a base station controller.

A user equipment may be a wireless terminal or a wired terminal, and the wireless terminal may refer to a device that provides voice and/or data connectivity for a user, a handheld device with a wireless connection function, or another processing device connected to a wireless modem. The wireless terminal may communicate with one or more core networks over a radio access network (RAN), and the wireless terminal may be a mobile terminal such as a mobile phone (or called a "cellular" phone) or a computer with a mobile terminal, for example, may be a portable, pocket-sized, handheld, computer built-in, or vehicle-mounted mobile apparatus, which exchanges voice and/or data with the radio access network. For example, the wireless terminal is a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile, a remote station, an access point, a remote terminal, an access terminal, a user terminal, a user agent, a user device, or a user equipment.

A base station (for example, an access point) may refer to a device that communicates with the wireless terminal by using one or more sectors on an air interface in an access network. The base station may be configured to perform mutual conversion between a received air frame and an IP packet, and functions as a router between the wireless terminal and a remaining part of the access network, where the remaining part of the access network may include an Internet Protocol (IP) network. The base station may further coordinate attribute management for the air interface. For example, the base station may be a base transceiver station (BTS), in GSM or CDMA, or a NodeB (NodeB) in WCDMA, or an evolved NodeB (NodeB or eNB or e-NodeB) in LTE, which is not limited in the present invention.

A base station controller may be a base station controller (BSC) in GSM or CDMA, or a radio network controller (RNC) in WCDMA, which is not limited in the present invention.

In addition, in this specification, the terms "system" and "network" are generally interchangeable. In this specification, the term "and/or" is only an association relationship for describing associated objects, and represents that three relationships may exist, for example, A and/or B may represent the following three cases: A exists alone, both A and B exist, and B exists alone. In addition, the character "/" in this specification generally represents that a former associated object and a latter associated object are in an "or" relationship.

Because all the embodiments of the present invention are described based on a case that a user equipment (UE) is handed over from a macro cell to a micro cell, in all the embodiments of the present invention, a source cell is a macro cell, and a target cell is a micro cell.

Embodiment 1

As shown in FIG. 1, the embodiment of the present invention provides a network handover method includes the follow steps.

101: A source cell radio network controller (RNC) receives a measurement report message or a cell update message that is sent by a user equipment (UE).

If the source cell RNC receives the measurement report message sent by the UE, the UE directly sends the measurement report message to the source cell RNC, without a need of forwarding by another device.

The measurement report message may be added with a CSG ID and/or a cell access mode; or may not be added with a CSG ID and/or a cell access mode.

Figure 2:
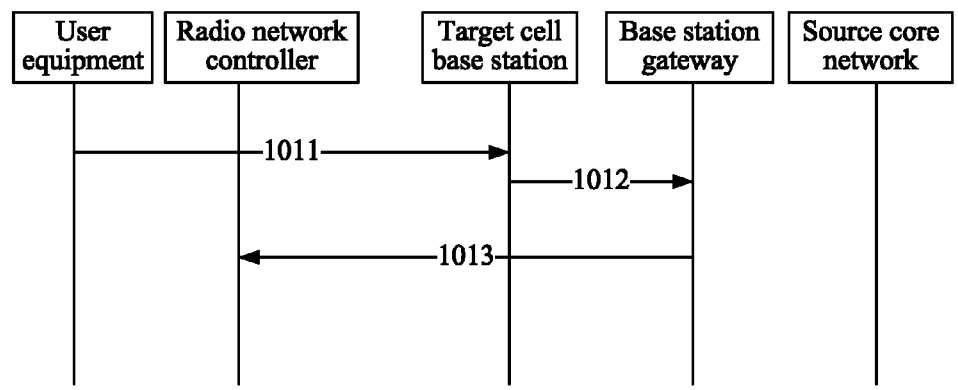
FIG. 2 is a schematic diagram of sending a message to a source cell RNC by a user equipment (UE) according to an embodiment of the present invention.

If the UE sends the cell update message to the source cell RNC, the following steps are performed alternatively, as shown in FIG. 2.

1011: The UE sends the cell update message to a target cell base station.

It should be noted that, the cell update message does not carry a user equipment (UE) identifier or UE capability indication information.

1012: After receiving the cell update message, the target cell base station sends an uplink signaling transmission indication message to a base station gateway, where the uplink signaling transmission indication message carries the cell update message.

1013: The base station gateway sends the uplink signaling transmission indication message to the source cell RNC.

The uplink signaling transmission indication message carries a CSG ID and/or a cell access mode, where specifically, in step 1012, the target cell base station may add the CSG ID and/or the cell access mode to the uplink signaling transmission indication message; or in step 1013, the base station gateway may add the CSG ID and/or the cell access mode to the uplink signaling transmission indication message. Definitely, the uplink signaling transmission indication message may also not carry the CSG ID and/or the cell access mode.

102: After receiving the measurement report message or the cell update message, the source cell RNC generates a handover request message or a radio link establishment request message according to the measurement report message or the cell update message.

In a case that the measurement report message carries the CSG ID and/or the cell access mode, the source cell RNC adds the CSG ID and/or the cell access mode to the handover request message or the radio link establishment request message that is generated by the source cell RNC; otherwise, the CSG ID and/or the cell access mode is not added.

In a case that the uplink signaling transmission indication message in step 1013 carries the CSG ID and/or the cell access mode, the source cell RNC adds the CSG ID and/or the cell access mode to the handover request message or the radio link establishment request message that is generated by the source cell RNC according to the cell update message; otherwise, the CSG ID and/or the cell access mode is not added.

In addition, when generating the handover request message or the radio link establishment request message, the source cell RNC adds, according to UE capability indication information stored by the source cell RNC, the UE capability indication information to the handover request message or the radio link establishment request message.

It should be noted that, the UE capability indication information may be indicated by two values that: the UE has a CSG capability and the UE has no CSG capability. In this case, if a value of the UE capability indication information is that the UE has a CSG capability, it indicates that the UE has a CSG capability; and if a value of the UE capability indication information is that the UE has no CSG capability, it indicates that the UE has no CSG capability. Definitely, the UE capability indication information may also be one value that the UE has a CSG capability. In this case, it may be considered that: if the handover request message or the radio link establishment request message carries the UE capability indication information, it indicates that the UE has a CSG capability. If the message carries no UE capability indication information, it indicates that the UE has no CSG capability.

103: The source cell RNC sends the handover request message or the radio link establishment request message to the base station gateway, and the base station gateway receives the handover request message or the radio link establishment request message.

In the case that the measurement report message carries the CSG ID and/or the cell access mode, if the source cell RNC adds, to the handover request message or the radio link establishment request message that is generated by the source cell RNC, the CSG ID and/or cell access mode information that is provided by the measurement report message, the base station gateway first needs to verify the CSG ID carried in the handover request message. If verification fails, the base station gateway generates a radio link establishment failure message or a handover failure message, and preferably, adds a cause value, which is information indicating that the CSG ID is invalid, to the handover failure message or the radio link establishment failure message; and the base station gateway sends the handover failure message or the radio link establishment failure message to the source cell RNC. Alternatively, when a target cell base station is in a hybrid mode, a real CSG ID is added to a handover response message or a radio link establishment response message and a message is sent to the source cell RNC. If verification is successful, and the base station gateway detects that the handover request message or the radio link establishment request message carries UE capability indication information indicating that the UE has a CSG capability, the base station gateway initiates a subsequent access control request message, that is, performs step 104.

In the case that the uplink signaling transmission indication message in step 1013 carries the CSG ID and/or the cell access mode, if the source cell RNC adds the CSG ID and/or the cell access mode information that is carried in the uplink signaling transmission indication message to the handover request message or the radio link establishment request message that is generated by the source cell RNC according to the cell update message, after receiving the handover request message or the radio link establishment request message, the base station gateway does not verify the CSG ID, and the base station gateway directly initiates a subsequent access control request message, that is, performs step 104.

If the source cell RNC does not add the CSG ID and/or the cell access mode information to the handover request message sent to the base station gateway, the base station gateway searches for the CSG ID of the target cell base station according to cell identifier information in the handover request message, and adds the information to a message that is to be sent subsequently, that is, adds the CSG ID to the access control request message.

In addition, if the base station gateway finds that the handover request message or the radio link establishment request message carries an indication message indicating that access control has been completed on a related UE, the base station gateway does not initiate an access control process, that is, does not perform subsequent steps 104-1061 or steps 104-1062, but directly sends the handover request message or the radio link establishment request message to the target cell base station.

104: The base station gateway sends an access control request message to a core network, and the core network receives the access control request message, and initiates an access control process.

Specifically, after adding, to the access control request message, a user equipment (UE) identifier and/or a target identifier and/or a source identifier and/or the cell access mode information, the base station gateway sends the access control request message to a core network connected to the base station gateway, so as to request the core network to initiate an access control process. If a core network node connected to the base station gateway is the same as a core network node connected to the source cell RNC, the core network connected to the base station gateway is a source core network, and the core network may directly find a user equipment (UE) context according to the UE identifier, and perform access control according to the CSG ID and UE subscription information. If a core network node connected to the base station gateway is different from a core network node connected to the source cell RNC, the core network connected to the base station gateway is a target core network, and in this case, the target core network needs to first forward the access control request message to a source core network by using the target identifier, and after receiving the handover request message, the source core network finds a user equipment (UE) context according to the UE identifier, and performs access control according to the CSG ID and UE subscription information, where the target identifier includes: a location area identifier (LAI), a routing area code (RAC), and a target cell radio network controller identifier (RNC ID); and the source identifier includes: a location area identifier (LAI), a routing area code (RAC), and a source cell radio network controller identifier (RNC ID).

It should be noted that, the target identifier and the source identifier are used for identifying the source cell RNC and the base station gateway respectively; when the target core network sends the access control request message to the source core network, the target identifier herein may be used for the target core network to determine a specific location to which the access control request message needs to be sent; when the source core network sends an access control response message to the target core network, the source identifier may be used for the source core network to determine a specific location to which the access control response message needs to be sent; and the source core network is described as the core network in the embodiment of the present invention.

It should be noted that, before the UE accesses the target cell base station, if the target cell base station is in a closed mode, it is required to first determine whether the UE has access permission; or if the target cell base station is in the hybrid mode, it is required to first perform member identity verification, so as to determine whether the UE performs access with a member user identity or a non-member user identity; and the two processes are indicated by using access control in the embodiment of the present invention.

Preferably, the base station gateway sends the access control request message to the core network by using connectionless signaling transmission.

It should be noted that, in a soft handover process, the target cell base station does not need to establish a signaling connection with the core network, and for a same UE, only one signaling connection exists on an interface Iu interface between the base station gateway and the core network, and therefore the target cell base station or the base station gateway needs to initiate the access control process to the core network by using connectionless signaling transmission.

105: After completing access control, the core network sends an access control response message to the base station gateway, and the base station gateway receives the access control response message.

Specifically, if the access control is successful, the core network generates access control response message, where the access control response message is added with state information indicating that the UE is a member and/or added with a message indicating that the access control is successful; and sends the access control response message to the base station gateway, and continues to perform step 1061.

If the access control fails, the core network generates access control response message, where the access control response message is added with a message indicating that the access control fails and/or added with state information indicating that the UE is a non-member; and sends the access control response message to the base station gateway, and continues to perform step 1062.

1061: The base station gateway sends the handover request message or the radio link establishment request message to the target cell base station, and the target cell base station receives the handover request message or the radio link establishment request message. Preferably, the base station gateway adds member state information to the handover request message or the radio link establishment request message.

1062: The base station gateway generates a handover failure message or a radio link establishment failure message. Preferably, the handover failure message or the radio link establishment failure message is added with a cause value, which is information indicating that access of the UE is not allowed. In addition, the base station gateway sends the handover failure message or the radio link establishment failure message to the source cell RNC.

The embodiment of the present invention provides a network handover method, where after receiving a handover request message or a radio link establishment request message, a base station gateway sends an access control request message to a core network, and after receiving access control response message, sends the handover request message or the radio link establishment request message to a target cell base station; in this way, when a user equipment (UE) is handed over from a macro cell to a micro cell, access control is performed by sending the access control request message by using the base station gateway, and a network handover from the macro cell to the micro cell is implemented by using a soft handover or hard handover method.

Embodiment 2

Figure 3:
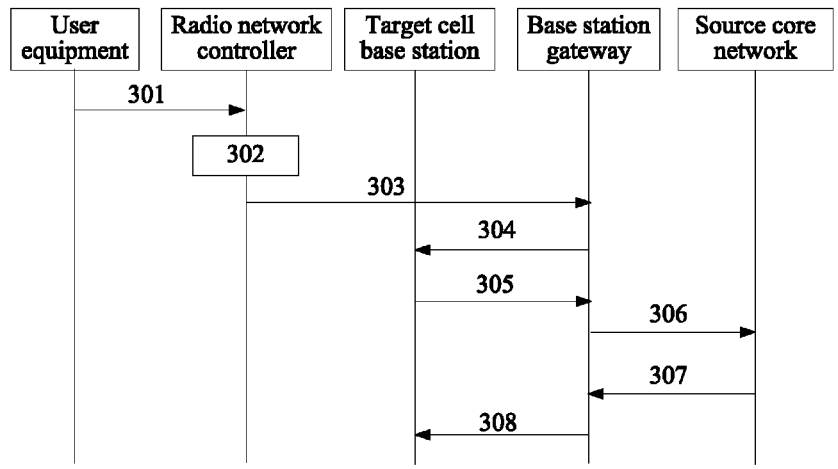
FIG. 3 is a schematic diagram of another network handover method according to an embodiment of the present invention.

As shown in FIG. 3, an embodiment of the present invention provides a network handover method.

301: A source cell radio network controller (RNC) receives a measurement report message or a cell update message that is sent by a user equipment (UE).

For a specific step, reference may be made to step 101 in Embodiment 1.

302: After receiving the measurement report message or the cell update message, the source cell RNC generates a handover request message or a radio link establishment request message according to the measurement report message or the cell update message.

In a case that the measurement report message carries a CSG ID and/or a cell access mode, the source cell RNC adds the CSG ID and/or the cell access mode to the handover request message or the radio link establishment request message that is generated by the source cell RNC; otherwise, the CSG ID and/or the cell access mode is not added.

It can be known from step 301 that, the cell update message is included in an uplink signaling transmission indication message, and if the uplink signaling transmission indication message further carries the CSG ID and/or the cell access mode, the source cell RNC adds the CSG ID and/or the cell access mode to the handover request message or the radio link establishment request message that is generated by the source cell RNC according to the cell update message; otherwise, the CSG ID and/or the cell access mode is not added.

In addition, when generating the handover request message or the radio link establishment request message, the source cell RNC adds, according to UE capability indication information stored by the source cell RNC, the UE capability indication information indicating that the UE has a CSG capability to the handover request message or the radio link establishment request message.

303: The source cell RNC sends the handover request message or the radio link establishment request message to a base station gateway, and the base station gateway receives the handover request message or the radio link establishment request message.

Specifically, in the case that the measurement report message carries the CSG ID and/or the cell access mode, if the source cell RNC adds, to the handover request message or the radio link establishment request message that is generated by the source cell RNC, the CSG ID and/or cell access mode information that is provided by the measurement report message, the base station gateway first needs to verify the CSG ID carried in the handover request message. If verification fails, the base station gateway generates a radio link establishment failure message or a handover failure message, and preferably, adds a cause value, which is Information indicating that the CSG ID is invalid, to the handover failure message or the radio link establishment failure message, and sends the handover failure message or the radio link establishment failure message to the source cell RNC. Alternatively, when a target cell base station is in a hybrid mode, a real CSG ID is added to a handover response message or a radio link establishment response message, and a message is sent to the source cell RNC. If verification is successful, and the base station gateway detects that the handover request message or the radio link establishment request message carries the UE capability indication information indicating that the UE has a CSG capability, the base station gateway initiates a subsequent radio network subsystem application part user adaptation (RNA) Connect message, that is, performs step 304.

In the case that the uplink signaling transmission indication message carries the CSG ID and/or the cell access mode, if the source cell RNC adds the CSG ID and/or the cell access mode information that is carried in the uplink signaling transmission indication message to the handover request message or the radio link establishment request message that is generated by the source cell RNC according to the cell update message, after receiving the handover request message or the radio link establishment request message, the base station gateway does not verify the CSG ID, and the base station gateway directly initiates a subsequent radio network subsystem application part user adaptation (RNA) Connect message, that is, performs step 304.

If the source cell RNC does not add, to the handover request message sent to the base station gateway, the CSG ID and/or the cell access mode information that is reported by the UE, the base station gateway searches for a CSG ID of a target cell base station according to cell identifier information in the handover request message, and adds the information to a message that is to be sent subsequently, that is, adds the CSG ID to an access control request message.

304: The base station gateway adds the handover request message to a radio network subsystem application part user adaptation (RNA) Connect message, and sends the RNA Connect message to a target cell base station, and the target cell base station receives the RNA Connect message.

If the target cell base station finds that the handover request message or the radio link establishment request message carries an indication message indicating that access control has been completed on a related UE, the target cell base station does not initiate an access control process, that is, does not perform subsequent steps 305-308, but directly receives the RNA Connect message sent by the base station gateway.

305: After receiving the RNA Connect message, the target cell base station sends a radio access network application part connect RUA Connect message to the base station gateway, and the base station gateway receives the RUA Connect message.

Specifically, after receiving the RNA Connect message, the target cell base station knows, by parsing, that the RNA Connect message carries the handover request message or the radio link establishment request message, and the target cell base station generates an access control request message, adds the access control request message to the RUA Connect message, and sends a message to the base station gateway, and the base station gateway receives the message.

306: The base station gateway sends an access control request message to a core network, and the core network receives the access control request message, and initiates an access control process.

Specifically, after generating an access control request message, and adding, to the access control request message, a user equipment (UE) identifier and/or a target identifier and/or a source identifier and/or the cell access mode information, the base station gateway sends the access control request message to a core network connected to the base station gateway, so as to request the core network to initiate an access control process. If a core network node connected to the base station gateway is the same as a core network node connected to the source cell RNC, the core network connected to the base station gateway is a source core network, and the core network may directly find a user equipment (UE) context according to the UE identifier, and perform access control according to the CSG ID and UE subscription information. If a core network node connected to the base station gateway is different from a core network node connected to the source cell RNC, the core network connected to the base station gateway is a target core network, and in this case, the target core network needs to first forward the access control request message to a source core network by using the target identifier, and after receiving the handover request message, the source core network finds a user equipment (UE) context according to the UE identifier, and performs access control according to the CSG ID and UE subscription information, where the target identifier includes: a location area identifier (LAI), a routing area code (RAC), and a target cell radio network controller identifier (RNC ID); and the source identifier includes: a location area identifier (LAI), a routing area code (RAC), and a source cell radio network controller identifier (RNC ID).

307: After completing access control, the core network sends access control response message to the base station gateway, and the base station gateway receives the access control response message.

Specifically, if the access control is successful, the core network generates access control response message, where the access control response message is added with state information indicating that the UE is a member and/or added with a message indicating that the access control is successful; and sends the access control response message to the base station gateway, and continues to perform step 308.

If the access control fails, the core network generates access control response message, where the access control response message is added with a message indicating that the access control fails and/or added with state information indicating that the UE is a non-member; and sends the access control response message to the base station gateway.

308: The base station gateway sends a radio access network application part direct transfer RUA Direct Transfer message to the target cell base station, and a target cell base station receives the RUA Direct Transfer message.

Specifically, the base station gateway adds the access control response message to an RUA Direct Transfer message, and sends the RUA Direct Transfer message to the target cell base station, and the target cell base station receives the message. If the access control response message received by the target cell base station is an access control failure message, the target cell base station generates a handover failure message or a radio link establishment failure message, and preferably, adds a cause value, which is that access of the UE is not allowed, to the handover failure message or the radio link establishment failure message.

The embodiment of the present invention provides a network handover method, where after receiving a handover request message or a radio link establishment request message that is sent by a base station gateway, a target cell base station sends an access control request message to the base station gateway, the base station gateway forwards the access control request message to a source core network, and after receiving access control response message, the base station gateway forwards the access control response message to the target cell base station; in this way, when a user equipment (UE) is handed over from a macro cell to a micro cell, access control is performed by sending the access control request message by using the target cell base station, and a network handover from the macro cell to the micro cell is implemented by using a soft handover or hard handover method.

Embodiment 3

Figure 4:
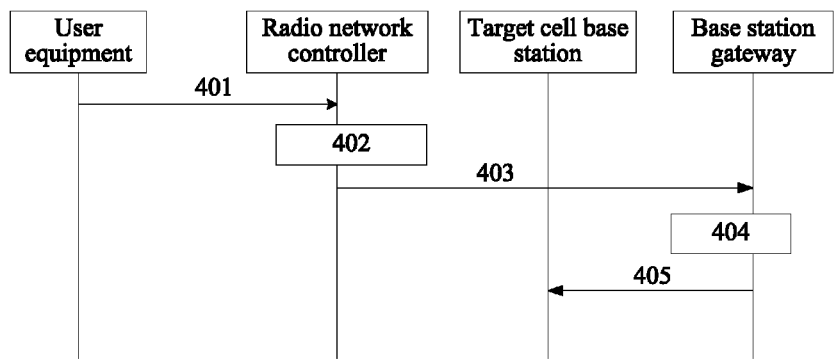
FIG. 4 is a schematic diagram of another network handover method according to an embodiment of the present invention.

As shown in FIG. 4, an embodiment of the present invention provides a network handover method.

401: A source cell radio network controller (RNC) receives a measurement report message or a cell update message that is sent by a user equipment (UE).

For a specific step, reference may be made to step 101 in Embodiment 1.

402: After receiving the measurement report message or the cell update message, the source cell RNC generates a handover request message or a radio link establishment request message according to the measurement report message or the cell update message.

The source cell RNC generates the handover request message or the radio link establishment request message according to the measurement report message or the cell update message, and adds, according to UE capability indication information stored by the source cell RNC, the UE capability indication information indicating that the UE has no CSG capability to the handover request message or the radio link establishment request message.

403: The source cell RNC sends the handover request message or the radio link establishment request message to a base station gateway, and the base station gateway receives the request message.

If the base station gateway finds that the handover request message or the radio link establishment request message carries an indication message indicating that access control has been completed on a related UE, the base station gateway does not initiate an access control process, that is, does not perform subsequent steps 404-405, but directly sends the handover request message or the radio link establishment request message to a target cell base station.

404: The base station gateway performs access control according to a user equipment (UE) identifier in the handover request message.

Specifically, after receiving the handover request message or the radio link establishment request message, the base station gateway finds that the UE capability indication information carried in the handover request message or the radio link establishment request message indicates that the UE has no CSG capability, and accordingly, the base station gateway directly performs access control according to the UE identifier in the handover request message or the radio link establishment request message.

405: The base station gateway sends response information.

Specifically, after the base station gateway completes the access control, if the access control is successful, the base station gateway sends the handover request message or the radio link establishment request message to the target cell base station. Preferably, the base station gateway adds member state information to the handover request message or the radio link establishment request message or an RNA Connect message.

If the access control fails, the base station gateway generates a handover failure message or a radio link establishment failure message, and sends the message to the source cell RNC, and preferably, adds a cause value, which is information indicating that access of the UE is not allowed, to the handover failure message or the radio link establishment failure message.

The embodiment of the present invention provides a network handover method, where after receiving a handover request message or a radio link establishment request message that carries UE capability indication information indicating that a user equipment (UE) has no CSG capability, a base station gateway performs an access control process; in this way, when the UE is handed over from a macro cell to a micro cell, if the UE capability indication information indicates that the UE has no CSG capability, access control is performed by using the base station gateway, and a network handover from the macro cell to the micro cell is implemented by using a soft handover or hard handover method.

Embodiment 4

Figure 5:
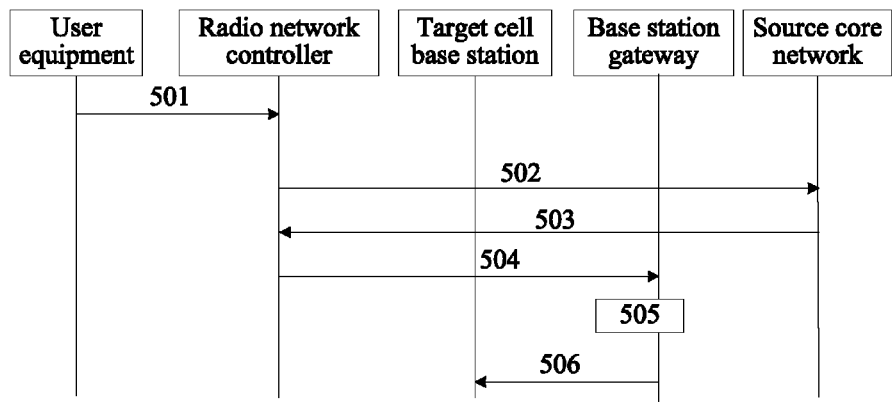
FIG. 5 is a schematic diagram of another network handover method according to an embodiment of the present invention.

As shown in FIG. 5, the embodiment of the present invention provides a network handover method.

501: A source cell RNC receives a measurement report message or a cell update message that is sent by a user equipment (UE).

For a specific step, reference may be made to step 101 in Embodiment 1.

502: The source cell RNC sends an access control request message to a core network, where the access control request message carries a CSG ID, and the core network receives the access control request message.

Specifically, if UE capability indication information stored by the source cell RNC indicates that the UE has a CSG capability, after generating the access control request message, and adding, to the access control request message, CSG ID information reported by the UE, the source cell RNC directly sends the access control request message to the core network, where the access control request message carries the CSG ID, a user equipment (UE) identifier, and a cell access mode.

It should be noted that, because the source cell RNC is directly connected to a core network node, no target identifier or source identifier information needs to be added to the access control request message.

503: The core network performs access control and sends access control response message to the source cell RNC, and the source cell RNC receives the access control response message.

Specifically, after receiving the access control request message, the core network finds a user equipment (UE) context according to the UE identifier, and performs access control according to the CSG ID and UE subscription information. After the access control is performed, if the access control is successful, the core network adds member state information and/or access control success message information to access control response message, and sends the access control response message to the source cell RNC, and the source cell RNC receives the access control response message. If the access control fails, the core network generates access control response message that includes an access control failure message and/or state information indicating that the UE is a non-member, and sends the access control response message to the source cell RNC.

504: The source cell RNC sends a handover request message or a radio link establishment request message to a base station gateway, and the base station gateway receives the handover request message or the radio link establishment request message.

Specifically, if the access control is successful, after receiving the access control response message, the source cell RNC generates a handover request message or a radio link establishment request message, and adds the CSG ID and/or the member state information to the handover request message or the radio link establishment request message, and sends the handover request message or the radio link establishment request message to the base station gateway, and the base station gateway receives the handover request message or the radio link establishment request message.

In a case that the measurement report message carries the CSG ID and/or the cell access mode, if the source cell RNC adds, to the handover request message or the radio link establishment request message that is generated by the source cell RNC, the CSG ID and/or cell access mode information that is provided by the measurement report message, the base station gateway needs to verify the CSG ID, that is, performs step 505.

If it can be known from step 501 that, the cell update message is included in an uplink signaling transmission indication message, if the uplink signaling transmission indication message further carries the CSG ID and/or the cell access mode, the source cell RNC adds the CSG ID and/or the cell access mode information that is carried in the uplink signaling transmission indication message to the handover request message or the radio link establishment request message that is generated by the source cell RNC according to the cell update message, after receiving the handover request message or the radio link establishment request message, the base station gateway does not verify the CSG ID, and the base station gateway directly sends the handover request message or the radio link establishment request message to the target cell base station.

505: The base station gateway verifies CSG ID information in the handover request message or the radio link establishment request message.

506: The base station gateway sends a handover response message or a radio link establishment response message.

Specifically, after receiving the handover request message or the radio link establishment request message, the base station gateway verifies the CSG ID, compares the CSG ID information in the handover request message or the radio link establishment request message with CSG ID information of a target cell base station that is stored by the base station gateway; and if the CSG ID information in the handover request message or the radio link establishment request message is consistent with the CSG ID information of the target cell base station, the base station gateway sends the handover request message or the radio link establishment request message to the target cell base station. If the CSG ID information in the handover request message or the radio link establishment request message is inconsistent with the CSG ID information of the target cell base station, the base station gateway generates a handover failure message or a radio link establishment failure message, and preferably, adds a cause value, which is Information indicating that the CSG ID is invalid, to the failure message, and sends the handover failure message or the radio link establishment failure message to the source cell RNC, or when a target cell is in a hybrid mode, adds a real CSG ID to a handover response message or a radio link establishment response message and sends the handover response message or the radio link establishment response message to the source cell RNC.

The embodiment of the present invention provides a network handover method, where after receiving a cell update message or a measurement report message, a source cell RNC sends an access control request message to a core network, and after receiving access control response message, sends a handover request message or a radio link establishment request message to a base station gateway, and the base station gateway forwards the handover request message or the radio link establishment request message to a target cell base station; in this way, when a user equipment (UE) is handed over from a macro cell to a micro cell, access control is performed by sending the access control request message by using the source cell RNC, and a network handover from the macro cell to the micro cell is implemented by using a soft handover or hard handover method.

Embodiment 5

Figure 6:
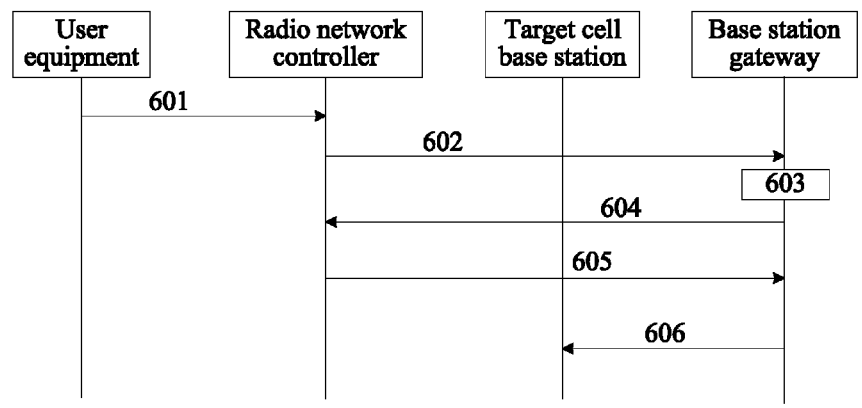
FIG. 6 is a schematic diagram of another network handover method according to an embodiment of the present invention.

As shown in FIG. 6, the embodiment of the present invention provides a network handover method.

601: A source cell radio network controller (RNC) receives a measurement report message or a cell update message that is sent by a user equipment (UE).

For a specific step, reference may be made to step 101 in Embodiment 1.

602: The source cell RNC sends an access control request message to a base station gateway, where the access control request message carries a CSG ID, and the base station gateway receives the access control request message.

Specifically, UE capability indication information stored by the source cell RNC indicates that the UE has no CSG capability, and the source cell RNC generates an access control request message, adds, to the access control request message, CSG ID information reported by the UE, and directly sends the access control request message to the base station gateway, where the access control request message carries the CSG ID, a user equipment (UE) identifier, and a cell access mode.

603: The base station gateway performs access control according to a user equipment (UE) identifier in the access control request message.

Specifically, after the base station gateway receives the access control request message, the base station gateway directly performs access control according to the UE identifier in the access control request message.

604: The base station gateway sends an access response message to the source cell RNC.

Specifically, after the base station gateway completes the access control, if the access control is successful, the base station gateway sends access control response message, where the access control response message is added with member state information and/or an access control success message, and sends the access control response message to the source cell RNC.

If the access control fails, the base station gateway generates access control response message, where the access control response message is added with state information indicating that the UE is a non-member and/or an access control failure message, and sends the access control response message to the source cell RNC.

605: The source cell RNC sends a handover request message or a radio link establishment request message to the base station gateway, and the base station gateway receives the request message, where the handover request message or the radio link establishment request message carries the CSG ID.

606: The base station gateway sends the handover request message or the radio link establishment request message to a target cell base station.

Specifically, in a case that the measurement report message carries the CSG ID and/or the cell access mode, if the source cell RNC adds, to the handover request message or the radio link establishment request message that is generated by the source cell RNC, the CSG ID and/or cell access mode information that is provided by the measurement report message, the base station gateway needs to verify the CSG ID. If verification fails, the base station gateway generates a radio link establishment failure message or a handover failure message and sends the radio link establishment failure message or the handover failure message to the source cell RNC, where preferably, a cause value, which is Information indicating that the CSG ID is invalid, is carried in the radio link establishment failure message or the handover failure message. Alternatively, when a target cell base station is in a hybrid mode, a real CSG ID is added to a handover response message or a radio link establishment response message and a message is sent to the source cell RNC. If verification is successful, the base station gateway sends the radio link establishment request message or the handover request message to the target cell base station.

If it can be known from step 601 that, the cell update message is included in an uplink signaling transmission indication message, if the uplink signaling transmission indication message further carries the CSG ID and/or the cell access mode, the source cell RNC adds the CSG ID and/or the cell access mode information that is carried in the uplink signaling transmission indication message to the handover request message or the radio link establishment request message that is generated by the source cell RNC according to the cell update message, after receiving the handover request message or the radio link establishment request message, the base station gateway does not verify the CSG ID, and the base station gateway directly sends the handover request message or the radio link establishment request message to the target cell base station.

The embodiment of the present invention provides a network handover method, where UE capability indication information stored by a source cell RNC indicates that a user equipment (UE) has no CSG capability, an access control request message is sent to a base station gateway, and the base station gateway performs an access control process; in this way, when the UE is handed over from a macro cell to a micro cell, if the UE capability indication information indicates that the UE has no CSG capability, access control is performed by using the base station gateway, and a network handover from the macro cell to the micro cell is implemented by using a soft handover or hard handover method.

Embodiment 6

Figure 7:
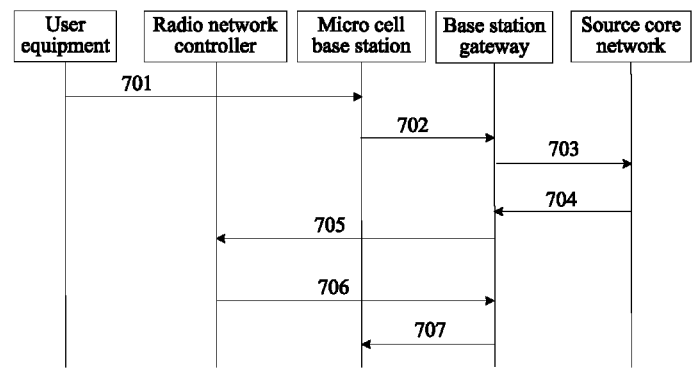
FIG. 7 is a schematic diagram of another network handover method according to an embodiment of the present invention.

As shown in FIG. 7, an embodiment of the present invention provides a network handover method.

701: A user equipment (UE) sends a cell update message to a target cell base station, and a target cell base station receives the cell update message, where the cell update message carries a user equipment (UE) identifier and/or UE capability indication information.

The UE identifier may be an IMSI (international mobile subscriber identity), or a TMSI (temporary mobile subscriber identity), or a P-TMSI (packet temporary mobile subscriber identity), or an IMEI (international mobile equipment identity). Preferably, the UE identifier is an IMSI.

After receiving the cell update message, the target cell base station detects that the UE capability indication information indicates that the UE has a CSG capability.

702: After receiving the cell update message, the target cell base station sends an uplink signaling transmission indication message to a base station gateway, where the uplink signaling transmission indication message carries the cell update message, and the base station gateway receives the uplink signaling transmission indication message.

703: After receiving the uplink signaling transmission indication message, the base station gateway sends an access control request message to a core network, and the core network receives the access control request message, and initiates an access control process.

Specifically, if after receiving the uplink signaling transmission indication message, the base station gateway detects that the UE capability indication information indicates that the UE has a CSG capability, the base station gateway generates an access control request message, and adds, to the access control request message, the UE identifier and/or a target identifier and/or a source identifier and/or cell access mode information, and then sends the access control request message to a core network connected to the base station gateway, so as to request the core network to initiate an access control process. If a core network node connected to the base station gateway is the same as a core network node connected to a source cell RNC, the core network connected to the base station gateway is a source core network, and the core network may directly find a user equipment (UE) context according to the UE identifier, and perform access control according to the CSG ID and UE subscription information. If a core network node connected to the base station gateway is different from a core network node connected to a source cell RNC, the core network connected to the base station gateway is a target core network, and in this case, the target core network needs to first forward the access control request message to a source core network by using the target identifier, and after receiving the handover request message, the source core network finds a user equipment (UE) context according to the UE identifier, and performs access control according to the CSG ID and UE subscription information, where the target identifier includes: a location area identifier (LAI), a routing area code (RAC), and a target cell radio network controller identifier (RNC ID); and the source identifier includes a location area identifier (LAI), a routing area code (RAC), and a source cell radio network controller identifier (RNC ID).

704: After completing access control, the core network sends access control response message to the base station gateway, and the base station gateway receives the access control response message.

Specifically, if the access control is successful, the core network generates access control response message, where the access control response message is added with state information indicating that the UE is a member and/or added with a message indicating that the access control is successful; and sends the access control response message to the base station gateway.

If the access control fails, the core network generates access control response message, where the access control response message is added with a message indicating that the access control fails and/or added with state information indicating that the UE is a non-member; and sends the access control response message to the base station gateway.

705: The base station gateway sends the uplink signaling transmission indication message to a source cell RNC, and the source cell RNC receives the uplink signaling transmission indication message.

Specifically, the base station gateway adds the cell update message and/or an access control completion indication message to the uplink signaling transmission indication message, where if the access control, the access control completion indication message carries member state information or carries an indication indicating that the UE can access the target cell; and if the access control fails, the access control completion indication message carries indication information indicating that the UE cannot access the target cell, and sends the uplink signaling transmission indication message to the source cell RNC, and the source cell RNC receives the message.

706: The source cell RNC sends a handover request message or a radio link establishment request message to the base station gateway.

Specifically, the source cell RNC generates the handover request message or the radio link establishment request message according to the cell update message in the uplink signaling transmission indication message, and optionally, adds the access control completion indication message to the handover request message or the radio link establishment request message, and sends the handover request message or the radio link establishment request message to the base station gateway, and the base station gateway receives the handover request message or the radio link establishment request message.

707: The base station gateway sends the handover request message or the radio link establishment request message to the target cell base station.

Optionally, the base station gateway detects that the handover request message or the radio link establishment request message carries an indication message indicating that access control has been completed on a related UE, and if the access control, the base station gateway directly sends the handover request message or the radio link establishment request message to the target cell base station.

The embodiment of the present invention provides a network handover method, where after receiving an uplink signaling transmission indication message, a base station gateway sends an access control request message to a core network, and after receiving access control response message, sends the uplink signaling transmission indication message to a source cell RNC, the source cell RNC sends a handover request message or a radio link establishment request message to the base station gateway, and the base station gateway forwards the handover request message or the radio link establishment request message to a target cell base station; in this way, when a user equipment (UE) is handed over from a macro cell to a micro cell, access control is performed by sending a access control request message by using the base station gateway, and a network handover from the macro cell to the micro cell is implemented by using a soft handover or hard handover method.

Embodiment 7

Figure 8:
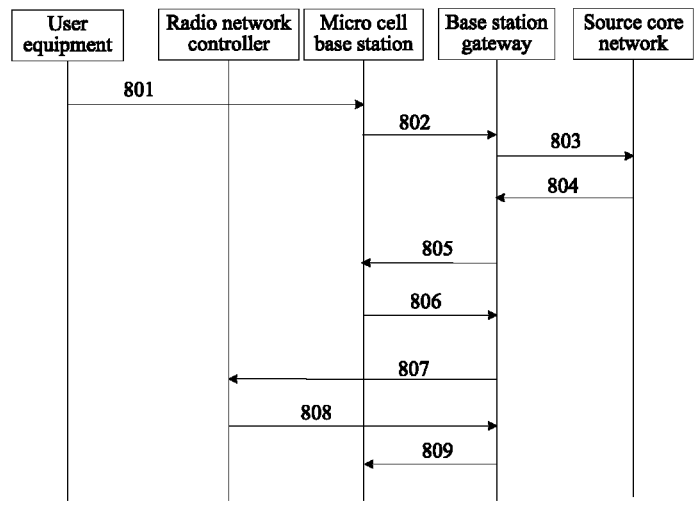
FIG. 8 is a schematic diagram of another network handover method according to an embodiment of the present invention.

As shown in FIG. 8, an embodiment of the present invention provides a network handover method.

801: A user equipment (UE) sends a cell update message to a target cell base station, and a target cell base station receives the cell update message, where the cell update message carries a user equipment (UE) identifier and UE capability indication information.

After receiving the cell update message, the target cell base station detects that the UE capability indication information indicates that the UE has a CSG capability.

802: A base station gateway receives a radio access network application part connect RUA Connect message sent by the target cell base station, where the RUA Connect message carries an access control request message.

803: The base station gateway sends the access control request message to a core network, where the access control request message carries a closed subscriber group identifier (CSG ID) of the target cell base station.

Specifically, if after receiving the cell update message, the target cell base station detects that the UE capability indication information indicates that the UE has a CSG capability, the target cell base station generates an access control request message, and adds, to the access control request message, the UE identifier and/or a target identifier and/or a source identifier and/or cell access mode information, and then sends the access control request message to a core network connected to the target cell base station, so as to request the core network to initiate an access control process. If a core network node connected to the base station gateway is the same as a core network node connected to a source cell RNC, the core network connected to the base station gateway is a source core network, and the core network may directly find a user equipment (UE) context according to the UE identifier, and perform access control according to the CSG ID and UE subscription information. If a core network node connected to the base station gateway is different from a core network node connected to a source cell RNC, the core network connected to the base station gateway is a target core network, and in this case, the target core network needs to first forward the access control request message to a source core network by using the target identifier, and after receiving the handover request message, the source core network finds a user equipment (UE) context according to the UE identifier, and performs access control according to the CSG ID and UE subscription information, where the target identifier includes: a location area identifier (LAI), a routing area code (RAC), and a target cell radio network controller identifier (RNC ID); and the source identifier includes: a location area identifier (LAI), a routing area code (RAC), and a source cell radio network controller identifier (RNC ID).

804: The core network sends access control response message to the base station gateway, and the base station gateway receives the access control response message that is sent by the core network after the core network performs identity verification on the UE.

Specifically, after the core network completes the access control, if the access control is successful, the core network generates access control response message, where the access control response message is added with state information indicating that the UE is a member and/or added with a message indicating that the access control is successful, and sends the access control response message to the base station gateway.

If the access control fails, the core network generates access control response message, where the access control response message is added with a message indicating that the access control fails and/or added with state information indicating that the UE is a non-member; and sends the access control response message to the base station gateway.

805: The base station gateway sends a radio access network application part direct transfer RUA Direct Transfer message to the target cell base station, where the RUA Direct Transfer message carries the access control response message, and the target cell base station receives the RUA Direct Transfer message.

Specifically, the base station gateway adds the access control response message to an RUA Direct Transfer message, and sends the RUA Direct Transfer message to the target cell base station, and the target cell base station receives the message.

806: The base station gateway receives an uplink signaling transmission indication message sent by the target cell base station, where the uplink signaling transmission indication message carries the cell update message and/or an access control completion indication message.

Specifically, after receiving the access control response message, the target cell base station adds the access control completion indication message to an uplink signaling transmission indication message, and sends the uplink signaling transmission indication message to the base station gateway, and the base station gateway receives the message. If the access control is successful, the access control completion indication message carries member state information or carries an indication indicating that the UE can access the target cell; and if the access control fails, the access control completion indication message carries indication information indicating that the UE cannot access the target cell.

807: The base station gateway sends the uplink signaling transmission indication message to a source cell RNC.

808: The base station gateway receives a handover request message or a radio link establishment request message sent by the source cell RNC.

Specifically, the source cell RNC generates the handover request message or the radio link establishment request message according to the cell update message in the uplink signaling transmission indication message, and optionally, adds the access control completion indication message to the handover request message or the radio link establishment request message, and sends the handover request message or the radio link establishment request message to the base station gateway, and the base station gateway receives the handover request message or the radio link establishment request message.

809: The base station gateway sends the handover request message or the radio link establishment request message to the target cell base station.

Specifically, the base station gateway detects that the handover request message or the radio link establishment request message carries an indication message indicating that access control has been completed on a related UE, and if the access control is successful, the base station gateway directly sends the handover request message or the radio link establishment request message to the target cell base station.

The embodiment of the present invention provides a network handover method, where after receiving a cell update message, a target cell base station sends an access control request message to a base station gateway, the base station gateway forwards the access control request message to a core network, and sends, to a target cell base station, access control response message sent by the core network, the target cell base station sends an uplink signaling transmission indication message to the base station gateway, the base station gateway forwards the uplink signaling transmission indication message to a source cell RNC, the source cell RNC sends a handover request message or a radio link establishment request message to the base station gateway, and the base station gateway forwards the handover request message or the radio link establishment request message to the target cell base station; in this way, when a user equipment (UE) is handed over from a macro cell to a micro cell, access control is performed by sending the access control request message by using the target cell base station, and a network handover from the macro cell to the micro cell is implemented by using a soft handover or hard handover method.

Embodiment 8

Figure 9:
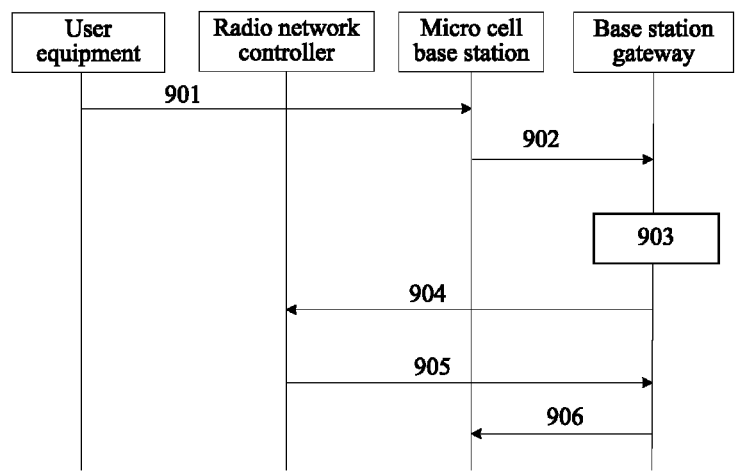
FIG. 9 is a schematic diagram of another network handover method according to an embodiment of the present invention.

As shown in FIG. 9, an embodiment of the present invention provides a network handover method.

901: A user equipment (UE) sends a cell update message to a target cell base station, and a target cell base station receives the cell update message.

After receiving the cell update message, the target cell base station detects that UE capability indication information indicates that the UE has no CSG capability.

902: A base station gateway receives an uplink signaling transmission indication message sent by the target cell base station, where the uplink signaling transmission indication message carries the cell update message, the cell update message carries UE capability indication information and/or a user equipment (UE) identifier, and the UE capability indication information indicates that the UE has no CSG capability.

After receiving the cell update message, the target cell base station adds, to an uplink signaling transmission indication message, the cell update message that carries the UE capability indication information indicating that the UE has no CSG capability and UE identifier information, and sends the uplink signaling transmission indication message to the base station gateway.

903: The base station gateway performs access control according to a user equipment (UE) identifier.

Specifically, if after receiving the uplink signaling transmission indication message, the base station gateway finds that the UE capability indication information carried in the uplink signaling transmission indication message indicates that the UE has no CSG capability, the base station gateway directly performs access control according to the UE identifier in the uplink signaling transmission indication message.

904: The base station gateway sends the uplink signaling transmission indication message to a source cell RNC.

Specifically, after the base station gateway completes the access control, if the access control is successful, the base station gateway generates access control response message, where the access control response message is added with an access control success message indicating that the access control is successful, adds the access control response message to the uplink signaling transmission indication message, and optionally, also adds an access control completion indication message to the uplink signaling transmission indication message, and sends the uplink signaling transmission indication message to the source cell RNC, and performs step 905. The access control completion indication message carries member state information or carries an indication indicating that the UE can access the target cell.

If the access control fails, optionally, the base station gateway adds the access control completion indication message to the uplink signaling transmission indication message, and sends the uplink signaling transmission indication message to the source cell RNC, and ends the process. The access control completion indication message carries indication information indicating that the UE cannot access the target cell.

905: The base station gateway receives a handover request message or a radio link establishment request message that is sent by the source cell RNC.

Specifically, the source cell RNC generates the handover request message or the radio link establishment request message according to the cell update message in the uplink signaling transmission indication message, and optionally, adds the access control completion indication message to the handover request message or the radio link establishment request message, and sends the handover request message or the radio link establishment request message to the base station gateway, and the base station gateway receives the handover request message or the radio link establishment request message.

906: The base station gateway sends the handover request message or the radio link establishment request message to the target cell base station.

Specifically, the base station gateway detects that the handover request message or the radio link establishment request message carries an indication message indicating that access control has been completed on a related UE, and if the access control is successful, the base station gateway directly sends the handover request message or the radio link establishment request message to the target cell base station.

The embodiment of the present invention provides a network handover method, where after a base station gateway receives an uplink signaling transmission indication message that carries UE capability indication information indicating that a user equipment (UE) has no CSG capability, the base station gateway performs an access control process, and after access control is performed, sends the uplink signaling transmission indication message to a source cell RNC, the source cell RNC sends a handover request message or a radio link establishment request message to the base station gateway, and the base station gateway forwards the handover request message or the radio link establishment request message to a target cell base station; in this way, when a user equipment (UE) is handed over from a macro cell to a micro cell, if the UE capability indication information indicates that the UE has no CSG capability, access control is performed by using the base station gateway, and a network handover from the macro cell to the micro cell is implemented by using a soft handover or hard handover method.

The present invention further provides an apparatus corresponding to the network handover method.

Figure 10:
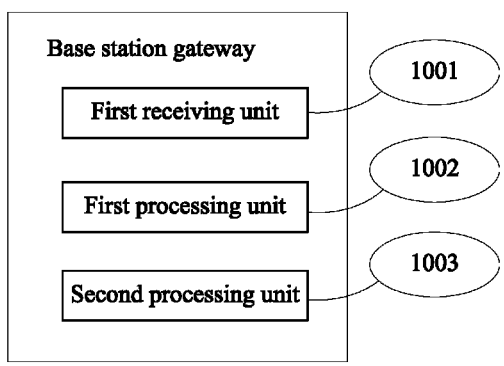
FIG. 10 is a schematic structural diagram of a base station gateway according to an embodiment of the present invention.

As shown in FIG. 10, an embodiment of the present invention provides a base station gateway, including: a first receiving unit 1001, and a first processing unit 1002, and/or a second processing unit 1003.

The first receiving unit 1001 is configured to receive and process a handover request message or a radio link establishment request message that is sent by a source cell RNC.

Figure 11:
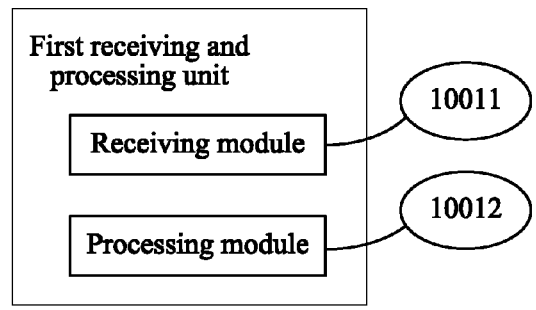
FIG. 11 is a schematic structural diagram of a first receiving unit of the base station gateway shown in FIG. 10.

The first receiving unit 1001 includes: a receiving module 10011 and a processing module 10012, as shown in FIG. 11.

The receiving module 10011 is configured to receive the handover request message sent by the source cell RNC.

The processing module 10012 is configured to: if the handover request message received by the receiving module carries a CSG ID of a target cell base station, verify the CSG ID; and if verification fails, instruct a first sending unit to send a radio link establishment failure message or a handover failure message to the source cell RNC; or, add a real CSG ID to a handover response message or a radio link establishment response message, and send a handover response message or a radio link establishment response message to the source cell RNC.

The first processing unit 1002 is configured to perform an access control process; and/or, the second processing unit 1003 is configured to initiate an access control process to a core network.

In a case that UE capability indication information in the handover request message or the radio link establishment request message indicates that a user equipment (UE) has no CSG capability, the first processing unit 1002 is configured to perform the access control process.

In a case that UE capability indication information in the handover request message or the radio link establishment request message indicates that a user equipment (UE) has a CSG capability, the second processing unit 1002 is configured to initiate the access control process to the core network; or configured to receive an access control request message sent by the target cell base station, forward the request message to the core network, receive an access control response message sent by the core network, and forward the message to the target cell base station.

Figure 12:
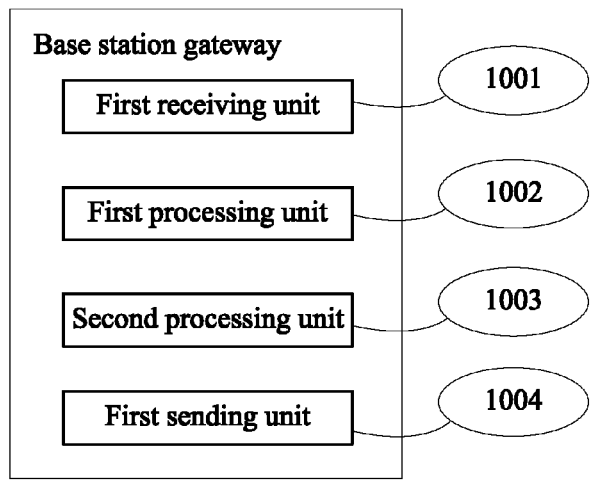
FIG. 12 is a schematic structural diagram of another base station gateway according to an embodiment of the present invention.

As shown in FIG. 12, the base station gateway further includes:

a first sending unit 1004, configured to: in a case that access control is successful, add member state information to the radio link establishment request message or the handover request message, and send the radio link establishment request message or the handover request message to the target cell base station, or add member state information and/or a message indicating that the access control is successful to a radio network subsystem application part user adaptation (RNA) Connect message, and send an RNA Connect message to the target cell base station; and in a case that access control fails, send a radio link establishment failure message or a handover failure message, or forward a radio link establishment failure message or a handover failure message that is sent by the target cell base station, and/or send state information indicating that the UE is a non-member to the source cell RNC, where preferably, the radio link establishment failure message or the handover failure message carries a cause value, which is that access of the UE is not allowed.

Figure 13:
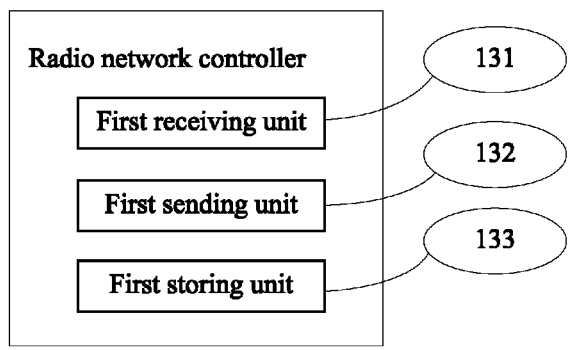
FIG. 13 is a schematic structural diagram of a radio network controller according to an embodiment of the present invention.

As shown in FIG. 13, an embodiment of the present invention further provides a source cell radio network controller (RNC), including: a first receiving unit 131, a first sending unit 132, and a first storing unit 133.

The first receiving unit 131 is configured to receive a cell update message or a measurement report message that is sent by a user equipment (UE).

The first storing unit 133 is configured to store UE capability indication information and cell identifier information.

Figure 14:
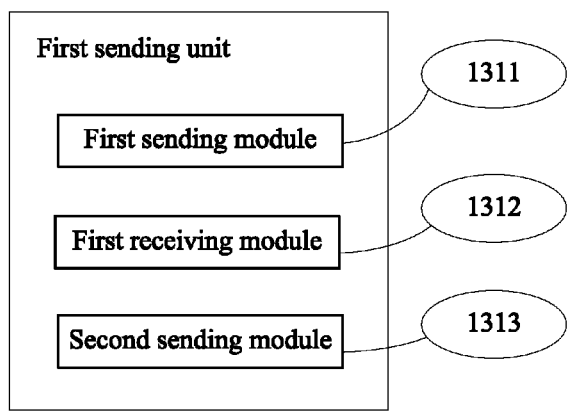
FIG. 14 is a schematic structural diagram of a first sending unit in the radio network controller shown in FIG. 13.

As shown in FIG. 14, the first sending unit 132 includes: a first sending module 1311, a first receiving module 1312, and a second sending module 1313.

The first sending module 1311 is configured to send an access control request message to a core network or a base station gateway, where the access control request message carries a closed subscriber group identifier (CSG ID) of a target cell base station.

The first receiving module 1312 is configured to receive access control response message sent by the core network or the base station gateway.

The second sending module 1313 is configured to send a handover request message or a radio link establishment request message to the base station gateway, where the handover request message or the radio link establishment request message carries the CSG ID and/or member state information.

The first sending unit 132 is configured to initiate an access control process to the core network or the base station gateway; and in a case that the UE capability indication information stored by the first storing unit 133 of the source cell RNC indicates that a user equipment (UE) has a CSG capability, send the access control request message to the core network; and in a case that the UE capability indication information stored by the first storing unit 133 of the source cell RNC indicates that a user equipment (UE) has no CSG capability, send the access control request message to the base station gateway.

Figure 15:
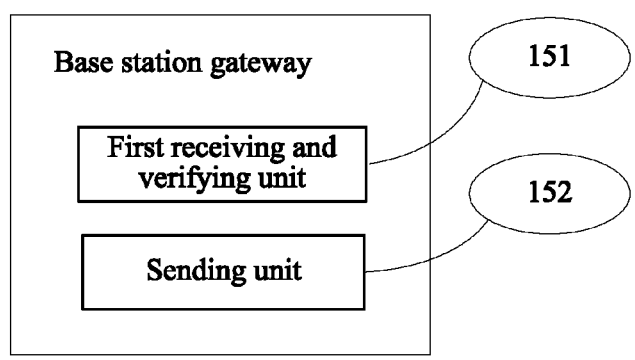
FIG. 15 is a schematic structural diagram of another base station gateway according to an embodiment of the present invention.

As shown in FIG. 15, an embodiment of the present invention further provides a base station gateway, including: a first receiving and verifying unit 151 and a sending unit 152.

The first receiving and verifying unit 151 is configured to receive and verify a handover request message or a radio link establishment request message that is sent by a source cell RNC, where the handover request message or the radio link establishment request message carries a CSG ID.

The sending unit 152 is configured to send a handover response message or a radio link establishment response message or radio link establishment response message.

Figure 16:
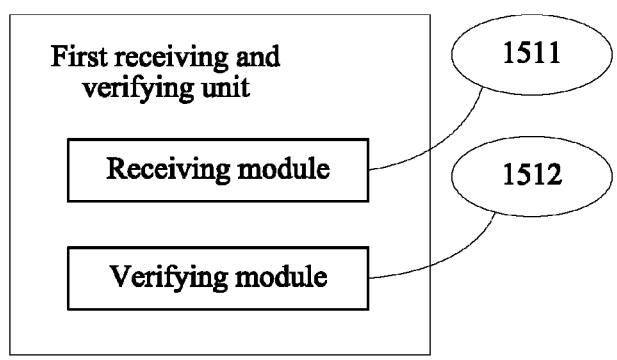
FIG. 16 is a schematic structural diagram of a first receiving and verifying unit of the base station gateway shown in FIG. 15.

As shown in FIG. 16, the first receiving and verifying unit 151 includes: a receiving module 1511 and a verifying module 1512.

The receiving module 1511 is configured to receive the handover request message or the radio link establishment request message that is sent by the source cell RNC, where the handover request message or the radio link establishment request message carries the CSG ID.

The verifying module 1512 is configured to verify the CSG ID in the handover request message or the radio link establishment request message; and in a case that verification fails, generate a radio link establishment failure message or a handover failure message, and instruct the sending unit 152 to send the handover failure message or the radio link establishment failure message to the source cell RNC; or generate a handover response message or a radio link establishment response message that is added with a real CSG ID, and instruct the sending unit 152 to send the handover response message or the radio link establishment response message to the source cell RNC.

Figure 17:
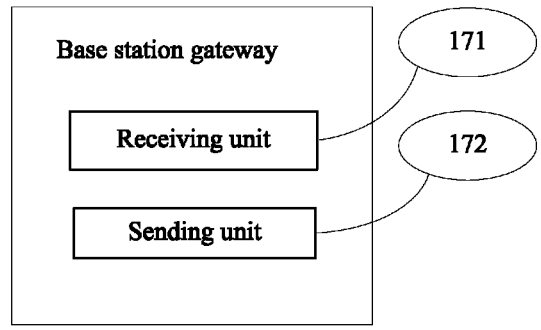
FIG. 17 is a schematic structural diagram of another base station gateway according to an embodiment of the present invention.

As shown in FIG. 17, an embodiment of the present invention further provides a base station gateway, including: a receiving unit 171 and a sending unit 172.

The receiving unit 171 is configured to receive an uplink signaling transmission indication message sent by a target cell base station, where the uplink signaling transmission indication message carries a cell update message and/or a CSG ID and/or a cell access mode.

The sending unit 172 is configured to send the uplink signaling transmission indication message to a source cell RNC.

Figure 18:
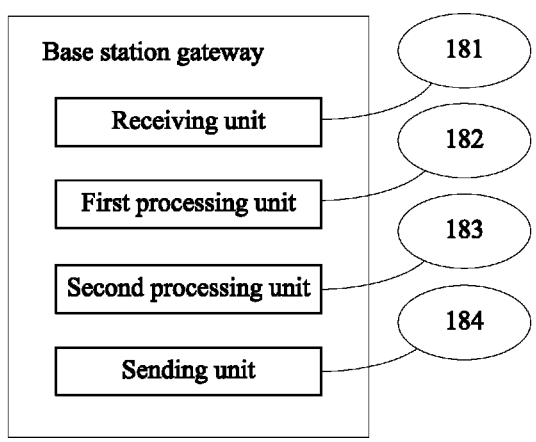
FIG. 18 is a schematic structural diagram of another base station gateway according to an embodiment of the present invention.

As shown in FIG. 18, an embodiment of the present invention provides a base station gateway, including: a receiving unit 181, a first processing unit 182 and/or second processing unit 183, and a sending unit 184.

The receiving unit 181 is configured to receive an uplink signaling transmission indication message sent by a target cell base station, where the uplink signaling transmission indication message carries a cell update message, and the cell update message carries a user equipment (UE) identifier and/or UE capability indication information.

The first processing unit 182 is configured to perform an access control process; and/or, the second processing unit 183 is configured to initiate an access control process to a core network.

In a case that the UE capability indication information in the cell update message indicates that a user equipment (UE) has no CSG capability, the first processing unit 182 is configured to perform the access control process. In a case that the UE capability indication information in the cell update message indicates that a user equipment (UE) has a CSG capability, the second processing unit 183 is configured to initiate the access control process to the core network; or configured to receive an access control request message sent by the target cell base station, forward the request message to the core network, receive an access control response message sent by the core network, and forward the message to the target cell base station.

The sending unit 184 is configured to send the uplink signaling transmission indication message to a source cell RNC, where the uplink signaling transmission indication message carries the cell update message and/or an access control completion indication message.

The embodiments of the present invention provide a base station gateway and a radio network controller, where when a user equipment (UE) is handed over from a macro cell to a micro cell, an access control process is initiated by using a base station gateway of the micro cell or an RNC of the macro cell, and access control is finally completed, and a network handover from the macro cell to the micro cell is implemented by using a soft handover or hard handover method.

Persons skilled in the art may clearly understand that, for convenient and brief description, dividing of the foregoing function modules is merely used as an example for description, and in actual application, the foregoing functions may be allocated to different modules and implemented according to needs, that is, the internal structure of the apparatus is divided into different function modules to implement all or part of the functions described above. For a detailed working process of the foregoing system, apparatus, and unit, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, the module or unit dividing is merely logical function dividing, and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be electrical, mechanical, or in other forms.

The units described as separate parts may or may not be physically separated, and parts shown as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each unit may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features of the technical solutions, as long as such modifications or replacements do not make the essence of corresponding technical solutions depart from scope of the technical solutions of the embodiments of the present invention.

What is claimed is:

1. A network handover method, comprising:
    receiving, by a base station gateway, a handover request message or a radio link establishment request message that is sent by a source cell radio network controller (RNC); and
    performing, by the base station gateway an access control process or initiating the access control process to a core network in response to receiving the handover request message or radio link establishment request message from the source cell RNC;
    wherein receiving the handover request message or the radio link establishment request message that is sent by a source cell RNC comprises:
        when the handover request message or the radio link establishment request message that is received by the base station gateway carries a closed subscriber group identifier (CSG ID) of a target cell base station, verifying, by the base station gateway, the CSG ID; and
        when verification fails, generating, by the base station gateway, a radio link establishment failure message or a handover failure message and sending the radio link establishment failure message or the handover failure message from the base station gateway to the source cell RNC, or when verification fails, generating, by the base station gateway, a handover response message or a radio link establishment response message that is added with a real closed subscriber group identifier (CSG ID) and sending the handover response message or the radio link establishment response message from the base station gateway to the source cell RNC.

2. The network handover method according to claim 1, wherein performing the access control process or initiating the access control process to the core network comprises:
   when UE capability indication information in the handover request message or the radio link establishment request message indicates that a user equipment (UE) has no closed subscriber group (CSG) capability, performing, by the base station gateway, the access control process; and
   when UE capability indication information in the handover request message or the radio link establishment request message indicates that the UE has CSG capability, initiating, by the base station gateway, the access control process to the core network.

3. The network handover method according to claim 1, wherein UE capability indication information in the handover request message or the radio link establishment request message indicates that a user equipment (UE) has a closed subscriber group (CSG) capability;
   wherein performing the access control process or initiating the access control process to the core network comprises initiating, by the base station gateway, the access control process to the core network by:
      generating, by the base station gateway, an access control request message, sending the access control request message to the core network, and receiving an access control response message sent by the core network; or
      receiving, by the base station gateway, an access control request message sent by a target cell base station, forwarding the access control request message to the core network, receiving an access control response message sent by the core network, and forwarding the access control response message to the target cell base station.

4. The network handover method according to claim 1, wherein the base station gateway initiates the access control process to the core network by using connectionless signaling transmission.

5. The network handover method according to claim 1, further comprising:
   determining whether performing the access control process or initiating the access control process leads to a successful access control;
   when the access control is successful, adding, by the base station gateway, member state information to the radio link establishment request message or the handover request message, and sending the radio link establishment request message or the handover request message to a target cell base station; or adding, by the base station gateway, member state information to a radio network subsystem application part user adaptation (RNA) Connect message, and sending the RNA Connect message to the target cell base station; and
   when access control is not successful, generating or forwarding, by the base station gateway, a radio link setup failure message or a handover failure message that is sent by the target cell base station, and/or sending state information indicating that a user equipment (UE) is a non-member to the source cell RNC.

6. The network handover method according to claim 5, wherein the radio link setup failure message or the handover failure message carries a cause value that indicates that access of the UE is not allowed.

7. A network handover method, comprising:
   receiving a cell update message at a source cell radio network controller (RNC), the cell update message having been sent by a user equipment (UE) to a base station gateway and from the base station gateway to the source cell RNC;
   sending, by the source cell RNC, an access control request message to a core network or the base station gateway, wherein the access control request message carries a closed subscriber group identifier (CSG ID) of a target cell base station, the access control request message being sent in response to receiving the cell update message;
   performing access control, by the core network or the base station gateway that received the access control request message, according to the CSD ID carried in the access control request message;
   receiving, by the source cell RNC, access control response message sent by the core network or the base station gateway; and
   sending, by the source cell RNC, a handover request message or a radio link establishment request message to the base station gateway, wherein the handover request message or the radio link establishment request message carries the CSG ID and member state information.

8. The network handover method according to claim 7, wherein the access control request message to the core network or the base station gateway specifically comprises:
   when the UE has a CSG capability, sending the access control request message to the core network and, after receiving the access control request message, sending, by the core network, an access control response message to the source cell RNC; and
   when the UE does not have a CSG capability, sending the access control request message to the base station gateway and, after receiving the access control request message, sending, by the base station gateway, the access control response message to the source cell RNC.

9. A network handover method, comprising:
   receiving, by a base station gateway, an uplink signaling transmission indication message sent by a target cell base station after the target cell base station receives a cell update message sent by a user equipment (UE), wherein the cell update message carries a UE identifier and/or UE capability indication information, and wherein the target cell base station is a micro cell base station;
   performing, by the base station gateway, an access control process or initiating the access control process to a core network in response to receiving the uplink signaling transmission indication message sent by the target cell base station; and
   sending, by the base station gateway, the uplink signaling transmission indication message to a source cell radio network controller (RNC), wherein the uplink signaling transmission indication message carries the cell update message and/or an access control completion indication message.

10. The network handover method according to claim 9, wherein performing the access control process or initiating the access control process to the core network comprises:

when UE capability indication information in a handover request message or a radio link establishment request message indicates that the UE has no closed subscriber group (CSG) capability, performing, by the base station gateway, the access control process; and when UE capability indication information in the handover request message or the radio link establishment request message indicates that the UE has CSG capability, initiating, by the base station gateway, the access control process to the core network.

11. The network handover method according to claim 9, wherein UE capability indication information in a handover request message or a radio link establishment request message indicates that the UE has a closed subscriber group (CSG) capability;

wherein performing the access control process or initiating the access control process to the core network comprises initiating, by the base station gateway, the access control process to the core network; and wherein initiating the access control process to the core network specifically comprises:

generating, by the base station gateway, an access control request message, sending the access control request message to the core network, and receiving an access control response message sent by the core network; or receiving, by the base station gateway, the access control request message sent by the target cell base station, forwarding the access control request message to the core network, receiving the access control response message sent by the core network, and forwarding the access control response message to the target cell base station.

12. A base station gateway, comprising:

a receiver, configured to receive a handover request message or a radio link establishment request message that is sent by a source cell radio network controller (RNC), wherein the handover request message or the radio link establishment request message carries a closed subscriber group identifier (CSG ID);

a processor, configured to:

verify the handover request message or the radio link establishment request message in response to receiving the handover request message or the radio link establishment request message that is sent by the source cell RNC; and in response to verification failing, generating a first message, wherein the first message comprises a radio link establishment failure message or a handover failure message, or a handover response message, or a radio link establishment response message that is added with a real closed subscriber group identifier (CSG ID); and a transmitter, configured to send the first message to the source cell RNC.

13. A base station gateway, comprising:

a receiver, configured to receive an uplink signaling transmission indication message sent by a target micro cell base station, wherein the uplink signaling transmission indication message carries a cell update message and the cell update message carries a user equipment (UE) identifier and/or user equipment (UE) capability indication information;

a processor, configured to perform an access control process; and/or configured to initiate an access control process to a core network in response to receiving the uplink signaling transmission indication message sent by the target micro cell base station; and a transmitter, configured to send the uplink signaling transmission indication message to a source cell radio network controller (RNC), wherein the uplink signaling transmission indication message carries the cell update message and/or an access control completion indication message.

* * * * *